(12) United States Patent
Lim et al.

(10) Patent No.: US 11,481,085 B2
(45) Date of Patent: Oct. 25, 2022

(54) ELECTRONIC DEVICE AND FOLDER CONFIGURING METHOD THEREFOR

(71) Applicant: Samsung Electronics Co., Ltd., Suwon-si (KR)

(72) Inventors: Jungmin Lim, Suwon-si (KR); Soeun Kwon, Suwon-si (KR); Seongmin Je, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/420,005

(22) PCT Filed: Dec. 18, 2019

(86) PCT No.: PCT/KR2019/017951
§ 371 (c)(1),
(2) Date: Jun. 30, 2021

(87) PCT Pub. No.: WO2020/141763
PCT Pub. Date: Jul. 9, 2020

(65) Prior Publication Data
US 2022/0075506 A1 Mar. 10, 2022

(30) Foreign Application Priority Data
Jan. 3, 2019 (KR) .......................... 10-2019-0000822

(51) Int. Cl.
*G06F 3/04817* (2022.01)
(52) U.S. Cl.
CPC ................................ *G06F 3/04817* (2013.01)
(58) Field of Classification Search
CPC .................................................. G06F 3/04817
See application file for complete search history.

(56) References Cited

U.S. PATENT DOCUMENTS 7,213,028 B2   5/2007   Yoshida et
7,487,175 B2   2/2009   Yoshida et al.
(Continued)

FOREIGN PATENT DOCUMENTS

CN   103092604 B   9/2016
EP   2 983 074 A1   2/2016
(Continued)

OTHER PUBLICATIONS

European Search Report dated Jan. 4, 2022; European Appln. No 19907072.3-1216 / 3890292 PCT/KR2019017951.

*Primary Examiner* — Mong-Shune Chung
(74) *Attorney, Agent, or Firm* — Jefferson IP Law, LLP

(57) ABSTRACT

An electronic device is disclosed. An electronic device according to one embodiment comprises a display, a processor operatively connected to the display, and a memory operatively connected to the processor, wherein the memory is configured to store one or more applications and additional information related to the application, and the memory can store instructions for allowing, when executed, the processor to determine one or more categories to which a plurality of applications belong respectively, on the basis of at least some additional information of the plurality of applications installed in the electronic device, to determine an image corresponding to the one or more categories on the basis of at least some information related to icons of applications belonging to the same category from among the one or more categories, and to display, on the screen of the display, folders by category according to the determined image, including icons of the applications belonging to the same category. Additional various embodiments identified through the specification are possible.

15 Claims, 11 Drawing Sheets

(56) References Cited

U.S. PATENT DOCUMENTS

| | | | |
|---|---|---|---|
| 9,332,108 B2 | 5/2016 | Kim et al. | |
| 10,146,413 B2 | 12/2018 | Choi et al. | |
| 10,572,140 B2 | 2/2020 | Chen et al. | |
| 10,750,234 B2 | 8/2020 | Hong et al. | |
| 10,817,165 B2 | 10/2020 | Chen et al. | |
| 11,169,659 B2 | 11/2021 | Chen et al. | |
| 2012/0047138 A1 | 2/2012 | Akagi | |
| 2012/0088478 A1 | 4/2012 | Kim et al. | |
| 2013/0024794 A1* | 1/2013 | Ha | G06F 3/0485 715/765 |
| 2013/0097516 A1 | 4/2013 | Hong et al. | |
| 2013/0219319 A1* | 8/2013 | Park | G06F 3/0488 715/775 |
| 2014/0181751 A1 | 6/2014 | Won et al. | |
| 2014/0201655 A1* | 7/2014 | Mahaffey | G06F 3/04817 715/765 |
| 2014/0229898 A1* | 8/2014 | Terwedo | G06F 3/0482 715/835 |
| 2015/0149492 A1* | 5/2015 | Janakiraman | G06F 3/04817 707/758 |
| 2016/0041727 A1 | 2/2016 | Choi et al. | |
| 2016/0117079 A1* | 4/2016 | Huang | G06F 3/04817 715/738 |
| 2016/0309220 A1 | 10/2016 | Hong et al. | |
| 2017/0013460 A1* | 1/2017 | Boss | G06F 8/61 |
| 2017/0249070 A1 | 8/2017 | Chen et al. | |
| 2018/0048752 A1* | 2/2018 | Zhou | H04M 1/72403 |
| 2018/0188906 A1* | 7/2018 | Carter | G06F 3/0482 |
| 2019/0266129 A1* | 8/2019 | Huang | G06F 3/04883 |
| 2022/0027040 A1 | 1/2022 | Chen et al. | |

FOREIGN PATENT DOCUMENTS

| | | |
|---|---|---|
| JP | 2012-064297 A | 3/2012 |
| KR | 10-2004-0077556 A | 9/2004 |
| KR | 10-2013-0010364 A | 1/2013 |
| KR | 10-2013-0040610 A | 4/2013 |
| KR | 10-2016-0017532 A | 2/2016 |
| KR | 10-1718999 B1 | 3/2017 |

\* cited by examiner

ELECTRONIC DEVICE AND FOLDER CONFIGURING METHOD THEREFOR

TECHNICAL FIELD

Embodiments of the disclosure relate to a technology of constructing a folder including a plurality of icons.

BACKGROUND ART

An electronic device may provide various services through an application. The electronic device may display icons of applications, for example, on a background screen (or a home screen), may execute an application corresponding to an icon selected from the displayed icons, and may perform a specific function of the application. Although the icons may improve the convenience in using or executing the application, the icons may cause a user to be burdened in the management.

To reduce the burden, the electronic device may provide a function of sorting icons of applications in specified order (e.g., the order of names or the order of modified dates) or a function of searching for icons based on an application name.

DISCLOSURE

Technical Problem

In addition, the electronic device may provide a function of inserting icons of applications in one folder, depending on a user input. For example, when a user selects a function of selecting a plurality of icons and adding the selected icons in the folder, the electronic device may put the selected icons in the folder, in response to the selection of the user. Thereafter, when the user selects a folder, a plurality of icons contained in the selected folder may be displayed, an application corresponding to the icon selected from the plurality of icons may be executed, or the specific function may be performed. As described above, a conventional electronic device merely constructs a folder containing an application icon selected by a user in response to the request of the user.

Various embodiments of the disclosure provide an electronic device, capable of constructing a folder, which contains an icon of an application belonging to each category, for the category and a method for constructing the folder.

Technical Solution

According to an embodiment of the disclosure, an electronic device may include a display, and a processor operatively connected with the display, and a memory operatively connected with the processor. The memory may be configured to store at least one application and additional information associated with the application. The memory may store instructions that, when executed, cause the processor to determine, based at least partially on additional information on a plurality of applications installed in the electronic device, at least one category to which the plurality of applications belong, determine, based at least partially on relevant information on icons of applications belonging to the same category of the at least one category, an image corresponding to the at least one category, and display, on a screen of the display, a folder, which contains the icons of the applications belonging to the same category, for each category based on the determined image.

In addition, according to an embodiment of the disclosure, method for constructing a folder by an electronic device, may include determining, based at least partially on additional information on a plurality of applications installed in the electronic device, at least one category to which the plurality of applications belong, determining, based at least partially on relevant information on icons of applications belonging to each category, an image corresponding to the category, and displaying, on a screen of a display, a folder, which contains the icons of the applications belonging to the same category of the at least one category, for each category based on the determined image.

Advantageous Effects

According to the embodiments of the disclosure, as the folder containing the icon of the application for each category is provided, the convenience of the management and the use of the icon of the application may be enhanced. Besides, a variety of effects directly or indirectly understood through the disclosure may be provided.

DESCRIPTION OF DRAWINGS

In the following description made with respect to the accompanying drawings, same or similar components will be assigned with same or similar reference numerals.

MODE FOR INVENTION

Figure 1:
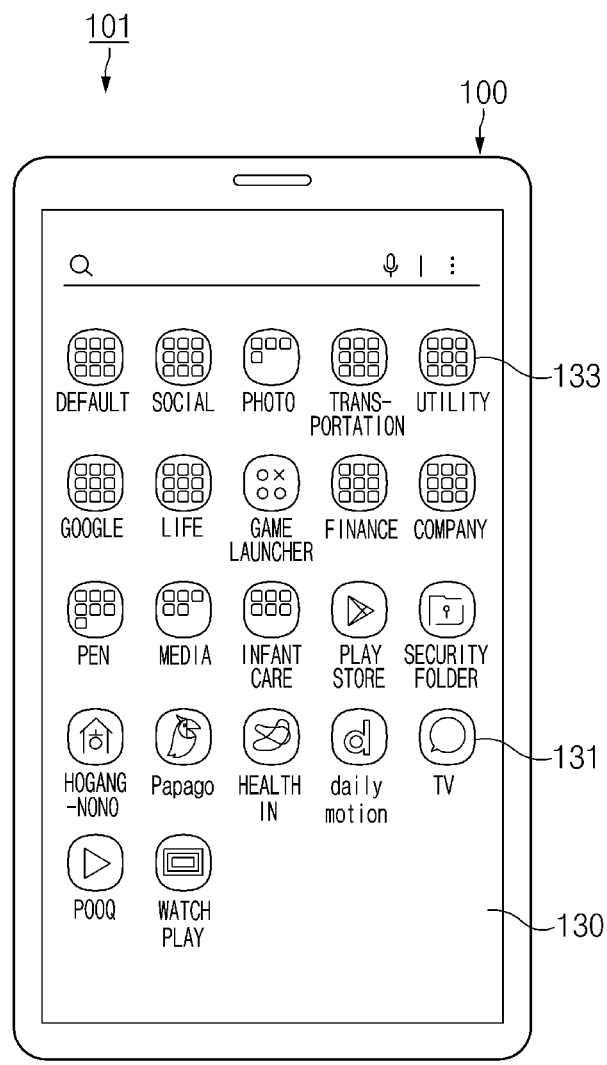
FIG. 1 illustrates a UI screen of an electronic device, according to an embodiment.

FIG. 1 illustrates a UI screen 101 of an electronic device, according to an embodiment.

According to an embodiment, an electronic device 100 may display icons (e.g., reference numeral 131) of a plurality of applications installed in the electronic device 100, on a first screen (e.g., a home screen or a background screen) of a display 130. The first screen may include one or more screens to display the list of the icons of the plurality of applications. The icon 131 of the application may include, for example, at least one of an application executing icon to execute an application or a function performing icon to perform a specific function of the application.

According to an embodiment, the electronic device 100 may determine (or classify) a category of a plurality of applications, and may display, on the first screen, a folder (e.g., reference numeral 133) containing icons of applications, which belong to the same category, of the plurality of applications, for each category. In this connection, the electronic device 100 may determine a category, to which each application belongs, based on additional information on the application. The additional information may include, for example, at least one of the name of the application, a package name of the application, the name of the manufacturer of the application, a tag associated with the application, a genre associated with the application, or a category associated with the application.

According to an embodiment, the electronic device 100 may determine an image for each category, based on relevant information on icons of applications belonging to the category, before displaying the folder for the category. The relevant information on the icons may include, for example, at least one of a color of the icons of the applications, a pattern of the icons, or a shape of the icons. The image for the category may include, for example, at least one of a folder shape, a folder background color, and a folder background pattern. The electronic device 100 may construct the folder for the category based on the image for the category, and may display, on the first screen, the folder for the category. According to various embodiments, the relevant information on the icons may include the names (e.g., application names) of the icons of the applications. In this case, the electronic device 100 may determine the image for the category, based on the names of the icons of the applications. According to various embodiments, the electronic device 100 may determine the image, which contains a text such as a folder name, for the category.

According to the above-described embodiment, the electronic device 100 may construct a folder containing icons of applications, based on a category, to which the applications belong, thereby resolving inconvenience of individually selecting an icon of an application to be contained in each folder when constructing the folder, and enhancing the convenience of the management and the use of the icon of the application.

In addition, according to the above-described embodiment, as the electronic device 100 determines an image of a folder for each category, based on relevant information on an icon of an application contained in the folder for the category, a user may more easily identify a folder or a category.

Figure 2:
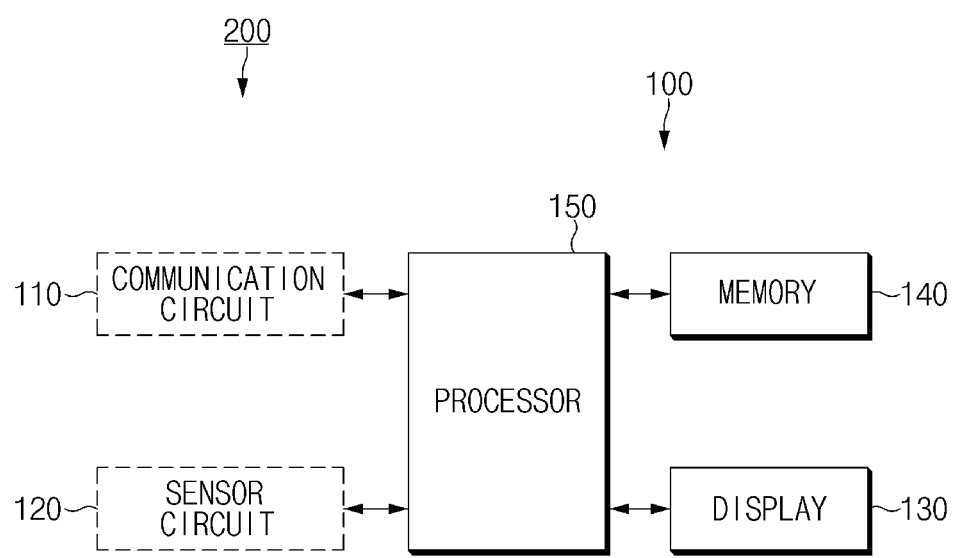
FIG. 2 illustrates a block diagram of an electronic device, according to an embodiment.

FIG. 2 illustrates a block diagram 200 of an electronic device, according to an embodiment.

Referring to FIG. 2, according to an embodiment, the electronic device 100 (e.g., the electronic device 100 of FIG. 1) may include the display 130 (e.g., the display 130 of FIG. 1), a memory 140, and a processor 150. According to an embodiment, the electronic device 100 may not include some components or may further include additional components. For example, the electronic device 100 may further include a communication circuit 110 and a sensor circuit 120. According to an embodiment, some of the components of the electronic device 100 may be combined with each other to form one entity and the functions of the components may be performed in the same manner as before the combination.

According to an embodiment, the communication circuit 110 may form a communication channel in a specified communication scheme. The specified communication scheme may include, for example, at least one of 3G, LTE, WiFi, or 5G.

According to an embodiment, the sensor circuit 120 may identify information on a position of the electronic device 100. For example, the sensor circuit 120 may identify the information on the position of the electronic device 100, based on information on a GPS or information on a relay (e.g., information on an AP or information on a base station).

According to an embodiment, the display 130 may display, for example, various types of content (e.g., a text, an image, a video, an icon, or a symbol). The display 130 may include, for example, a liquid crystal (LCD), a light-emitting diode (LED) display, an organic LED (OLED) display, or an electronic paper display.

For example, the memory 140 may store a command or data associated with at least one different component of the electronic device 100. The memory 140 may include a volatile memory (e.g., a RAM), a non-volatile memory (e.g., an ROM or a flash memory), or the combination thereof. According to an embodiment, the memory 140 may store instructions that when executed, cause the processor 150 to determine at least one category, to which each of a plurality of applications installed in the electronic device 100 belongs, based on additional information on the plurality of applications, to determine an image corresponding each category, based on relevant information on icons of applications belonging to the category, and to display, on the first screen of the display 130, a folder for the category based on the determined image, such that the icons of the applications belonging to the category are contained in the folder.

The processor 150 may execute arithmetic operation or data processing associated with control and/or communication of the elements included in the electronic device 100, by using the instructions stored in the memory 140. The processor 150 may include, for example, at least one of a central processing unit (CPU), a graphic processing unit (GPU), a micro-processor, an application processor, an application specific integrated circuits (ASIC), or a field programmable gate array (FPGA), or may have a plurality of cores.

According to an embodiment, the processor 150 may identify additional information on a plurality of applications installed in the electronic device 100 and may determine at least one category, to which the applications belong, based on the additional information on the applications. The additional information may include, for example, at least one of the name of the application, a package name of the application, the name of the manufacturer of the application, a tag associated with the application, a genre associated with the application, or a category associated with the application. The additional information may be received from an external server (e.g., a server at an App store site) which provides an application, and may be set through a user input. For example, the processor 150 may extract at least one keyword, which is matched to (corresponds to) the category name, from the additional information on the applications, and may determine a category, which employs the extracted keyword as the name of the category, as at least one category to which the applications belong. The at least one keyword may include a text corresponding to at least one of a genre name, a category name, or a manufacturer name. To this connection, the processor 150 may generate the category employing the extracted keyword as the category name, when the category name corresponding to the extracted keyword is absent. For another example, the electronic device 100 may determine applications, which provide a social service function, as applications belonging to a category of "social". To this connection, the processor 150 may determine a category, to which each application belongs, at at least one of a time point of a user request (e.g., a user request to construct a folder) or a time point to install an application.

Referring to following Table 1, the processor 150 may determine a first game application as belonging to a category of "game", may determine a first shopping application as belonging to categories of "shopping", "life style", and "finance", may determine a second game application as belonging to categories of "game" and "entertainment", and may determine a second shopping application as belonging to the category of "shopping"

TABLE 1

| Application | Category |
| --- | --- |
| First game app | Game |
| First shopping app | Shopping, Life style, Finance |
| Second game app | Game, Entertainment |
| Second shopping app | Shopping |

According to an embodiment, the processor 150 may construct a folder, which contains an icon of an application belonging to each category, for the category, based on at least one category to which the application belongs. For example, the processor 150 may construct a folder for each category, when a user request (e.g., a user request to construct the folder) is present, when an application is installed, or when an application is deleted. For example, when an application is installed, the processor 150 may re-construct a folder for a category, to which the installed application belongs, to contain an icon of the installed application. For example, when an application is deleted, the processor 150 may re-construct a folder for a category, to which the deleted application belongs, to exclude an icon of the deleted application. For another example, for social applications, which provide a social service function and are determined as belonging to the category of "social", the processor 150 may construct a folder which is named the category of "social" and contains icons of the social applications.

According to an embodiment, when constructing a folder for each category, the processor 150 may determine an image for the category, based on relevant information on icons of applications belonging to the category, and may construct the folder for the category based on the determined image. The image for the category may include, for example, at least one of a folder shape, a folder background color, and a folder background pattern. The relevant information on the icons may include, for example, at least one of a color of the icons of the applications, a pattern of the icons of the applications, or a shape of the icons of the applications. According to various embodiments, the relevant information on the icons may include the names (e.g., application names) of the icons of the applications. In this case, the processor 150 may determine the image for the category, based on the names of the icons of the applications. According to various embodiments, the processor 150 may determine an image for each category including a text, such as a folder name, and may construct a folder for the category based on the determined image.

According to an embodiment, the processor 150 may determine an image for each category, based on relevant information of an icon of an application, which is the most recently used, or an application, which has the highest frequency of use, all applications of applications belonging to the category. For example, the processor 150 may determine the image for the category such that the image has at least one feature of a color, the pattern, or the shape of the icon of the application, which is the most recently used, or has the highest frequency of use, of the applications belonging to the category. For another example, the processor 150 may determine, as a color (or pattern; shape) of a folder for each category, the most used color (or pattern; shape) for icons of all applications belonging to the category.

According to an embodiment, the processor 150 may determine an image for each category, based on the name of the category. For example, the processor 150 may determine an image for each category, based on information on at least one feature of a logo color, a logo pattern, or a logo shape of a relevant manufacturer, with respect to a category named the name of the manufacturer.

According to an embodiment, the processor 150 may construct a folder containing an icon of an application belonging to each category, by applying the same folder color, pattern, or shape to all categories.

According to an embodiment, the processor 150 may display a folder name around (e.g., under) a folder for each category, when displaying the folder for the category. For example, the processor 150 may display a category name by employing a folder name. According to an embodiment, the processor 150 may change the category name when the folder name is changed in response to a user input.

According to an embodiment, the processor 150 may insert an icon of a first application into folders corresponding to a plurality of categories, when the first application is identified as belonging to the plurality of categories. For example, the processor 150 may identify an application of "Samsung Pay" as belonging to a category of "shopping" and a category of "finance". In this case, the processor 150 may insert an icon of the application of "Samsung Pay" into a folder for the category of "shopping" and a folder for the category of "finance".

According to an embodiment, the processor 150 may merge, into one category, categories having category names having the same meaning or a similar meaning, of determined categories. For example, the processor 150 may merge, into one category, categories having category names with English uppercase letters, English lowercase letters, Korean, or other language having the same or similar meaning based on the dictionary meaning. For another example, the processor 150 may merge, into a category of "게임", a category of "GAME", a category of "game", and the category of "게임". In this connection, the processor 150 may display, through the display 130, a category list (e.g., the list of category names) corresponding to category names having the same meaning or a similar meaning, and may merge, into one category, at least some categories (e.g., categories selected in response to a user input), which are selected in response to the user input, in the category list.

According to an embodiment, the processor 150 may provide a user interface to specify a category name for merged categories, and may determine the category name for the merged categories, based on a user input to the user interface. For example, the processor 150 may display the list of category names and may determine a category name, which is selected from the list of category names, as the category name for the merged categories. For another example, the processor 150 may determine a category name, which is input and different from that in the list of the category names, as the category name for the merged categories.

According to an embodiment, the processor 150 may perform a folder changing operation (e.g., an operation of deleting a category, changing a category name, changing a folder image, adding an application in the folder, or deleting an application from the folder), based on a user input made with respect to a folder for each category, which is displayed. For example, the processor 150 may provide a first user interface for changing a folder, when a folder for each category is selected through a long press input. The processor 150 may add an icon for the selected folder, remove an icon from the selected folder, delete the selected folder, change a folder image, or set a tag associated with each category, based on an input to the first user interface. For another example, when a folder name for each category is selected through a long press input, the processor 150 may provide a second user interface for changing a category name, and may change the category name (or a folder name), in response to a user input to the second user interface.

According to an embodiment, the processor 150 may search for an application or a folder, based on at least one of an application name, a category name, a tag associated a category, or additional information on the application, when a search word is input into, for example, an application searching window or a folder searching window. To this end, when a category to which the application belongs is determined (classified), the processor 150 may link an application name to a category name and may store the link result.

According to various embodiments, additional information on an application may further include information on the use time of the application. The information on the use time of the application may include, for example, information on the most recent use. The processor 150 may determine applications, which have not been used for a specified period (e.g., one month) or more, as belonging to a first category (e.g., an unused app category), based on the information on the use time of the applications. The processor 150 may construct a first folder containing icons of the applications belonging to the first category, and may display the first folder on the first screen of the display 130. The processor 150 may identify the applications belonging to the first category periodically or upon a user request, may construct a folder for the first category, and may display the folder for the first category on the first screen of the display 130.

According to various embodiments, additional information on an application may further include information on a place in which the application is used. In this connection, the processor 150 may identify information on a position of the electronic device 100 by using the sensor circuit 120 when the application is used, and may store the identified information on the position, as the additional information of the application, in the memory 140. The processor 150 may determine, as belonging to a specified place category, applications, which are used for at least the specified number of times (e.g., three times) in a specified place (e.g., a registered place, home, or place), of a plurality of applications, based on information on places in which the plurality of applications are used. The processor 150 may construct a folder for the specified place category, which contains icons of applications belonging to the specified place category, and may display the folder of the specified place category on the first screen.

According to various embodiments, the additional information on the application may include information on the frequency of use of the application. The processor 150 may construct a folder, which contains icons of an application belonging to a user preference category used by a specified number of times (e.g., 3 times) or more, for the user preference category, based on the information on the frequency of use of the application, and may display, on the first screen, the folder for the user preference category.

According to various embodiments, the electronic device 100 is a foldable display device, and the sensor circuit 120 may detect status information (e.g., an unfolding status and a folding state) of the electronic device 100. In this case, the display 130 may include a foldable first display which is exposed through a first surface (e.g., the front surface) of the electronic device 100 and activated, when the electronic device 100 is in the unfolding status, and a second display which is exposed through a second surface of the electronic device 100 and activated when the electronic device 100 is in the folding status. According to various embodiments, the processor 150 may identify the folding status or the unfolding status of the electronic device 100 by using the sensor circuit 120 when the application is used, and may store the identified status information of the electronic device 100, as the additional information of the application, in the memory 140. Thereafter, the processor 150 may determine applications, which have been used by a specified number of times or more in the unfolding status of the electronic device 100, as belonging to a first user preference category, and may determine applications, which have been used by a specified number of times or more in the folding status of the electronic device 100, as belonging to the second user preference category, based on the information on the frequency of use of a plurality of applications and the status information of the electronic device 100. The processor 150 may construct a folder for the first user preference category, which contains an icon of applications belonging to the first user preference category in the unfolding status of the electronic device 100 and may display the folder on the first display. The processor 150 may construct a folder for the second user preference category through a second display in the folding status of the electronic device 100 and may display the folder on the second display.

According to the above-described embodiment, the electronic device 100 may construct a folder containing an icon of applications, based on a category, to which the applications belong, thereby resolving inconvenience of individually selecting an icon of an application to be contained in each folder when constructing the folder, and enhancing the convenience of the management and the use of the icon of the application.

In addition, according to the above-described embodiment, as the electronic device 100 determines an image of a folder for each category, based on relevant information on an icon of an application contained in the folder for the category, a user may more easily identify the folder or the category.

In addition, the electronic device 100 may link one application to a plurality of categories, and may provide a function of searching for an application based on a category name, thereby enhancing the search convenience and the use convenience of the application.

According to an embodiment, an electronic device (e.g., reference numeral 100 of FIG. 2) may include a display (e.g., the display 130 of FIG. 2), a processor (e.g., the processor 150 of FIG. 2) operatively connected with the display, and a memory (e.g., the memory 140 of FIG. 2) operatively connected with the processor. The memory may be configured to store at least one application and additional information associated with the application. The memory may store instructions that, when executed, cause the processor to determine, based at least partially on additional information on a plurality of applications, which are installed in the electronic device, at least one category to which each of the plurality of applications belong, determine, based at least partially on relevant information on icons of applications belonging to the same category of the at least one category, an image corresponding to the at least one category, display, on a screen of the display, a folder for each category, which contains the icon of the applications belonging to the same category, for each category based on the determined image.

The relevant information on the icons may include, for example, at least one of a color of the icons of the applications, a pattern of the icons of the applications, or a shape of the icon of the applications.

The instructions may cause the processor to determine the image, based at least partially on relevant information on an icon of an application, which is the most recently used, an application, which has the highest use frequency, or all applications of applications belonging to the category.

The additional information may include, for example, at least one of a name of the application, a package name of the application, a name of a manufacturer of the application, a tag associated with the application, a genre associated with the application, or a category associated with the application.

The instructions may cause the processor to insert an icon of a first application, which belongs to a plurality of categories, of the plurality of applications into folders for the plurality of categories.

The instructions may cause the processor to merge, into one category, categories, which correspond to a category name having the same meaning or a similar meaning, of the at least one category.

The instructions may cause the processor to display, on the screen, a category list corresponding to a category name having the same meaning or the similar meaning, and to merge, into one category, at least some categories in the category list, based at least partially on a user input for the category list.

The instructions may cause the processor to provide a user interface to specify the category name for categories having the same meaning or the similar name.

The additional information on the plurality of applications may further include information on use time of the plurality applications, and the instructions may cause the processor to determine applications, which have not been used for a specified period or more, of the plurality of applications, as belonging to a first category, based at least on the information on the use time of the applications, and to display, on the screen, a first folder, which contains icons of the applications which have not been used for the specified period or more, for the first category.

The additional information on the plurality of applications may further include information on a place in which the plurality of applications are used, and the instructions may cause the processor to determine applications, which are used for at least the specified number of times in a specified place, of the plurality of applications, as belonging to a specified place category, based at least on information on places in which the plurality of applications are used, and to display, on the screen, a folder, which contains an icon of applications belonging to the specified place category, for the specified place category.

The instructions may cause the processor to, when a search word for searching for an application is input, search for an application corresponding to the search word, based at least on the additional information on the plurality of applications.

Figure 3:
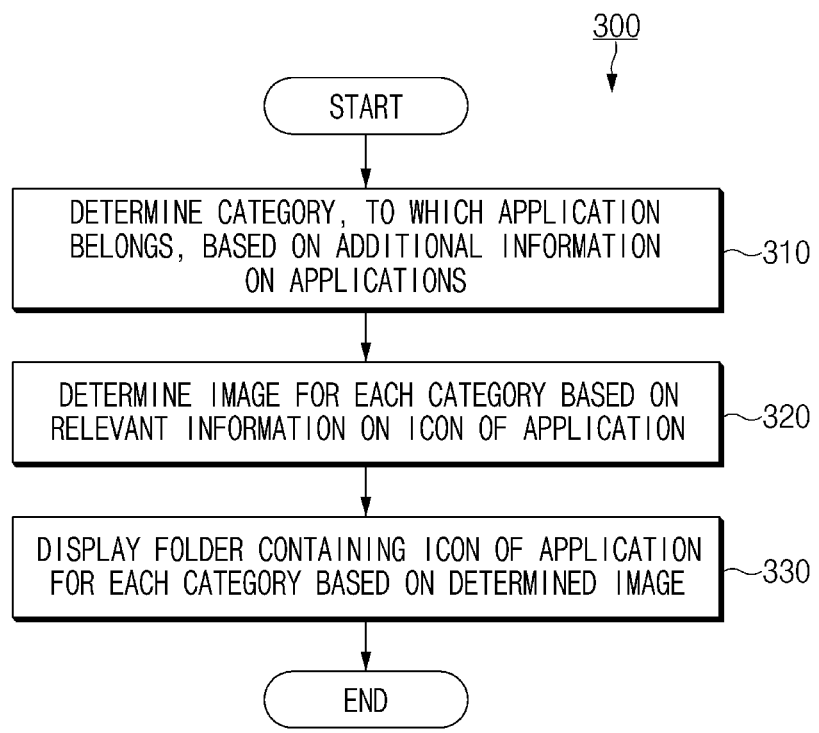
FIG. 3 illustrates a flowchart of a method for constructing a folder by an electronic device, according to an embodiment.

FIG. 3 illustrates a flowchart 300 of a method for constructing a folder by an electronic device, according to an embodiment.

Referring to FIG. 3, in operation 310, the electronic device 100 may determine a category, to which each application belongs, based on additional information of the application. The additional information may include, for example, at least one of the name of the application, a package name of the application, a name of the manufacturer of the application, a tag associated with the application, a genre associated with the application, or a category associated with the application. For example, the processor 150 may extract at least one keyword corresponding to the category name, from the additional information on the application, and may determine a category which employs the extracted at least one keyword as the category name and contains the application. In operation 310, the electronic device 100 may determine one or more categories, as a category to which one application belongs.

In operation 320, when a category of each application is determined, the electronic device 100 may determine an image for the category, based on relevant information on an icon of an application belonging to the category. The relevant information on the icon may include, for example, at least one of the color of the icon of the applications, a pattern of the icon of the applications, or the shape of the icon of the applications. For example, the processor 150 may identify relevant information on an icon of an application belonging to each category and may determine an image for the category, based on the relevant information on the icon.

In operation 330, the electronic device 100 may display, on the first screen of the display 130, a folder, which contains an icon of an application and is based on an image for each category, for the category. In operation 330, the processor 150 may display the name of the folder around (e.g., under) the folder for the category. With respect to an application, which belongs to a plurality of categories, of applications, the electronic device 100 may insert icons of the application into folders of the plurality of categories, According to an embodiment, a method for constructing a folder by an electronic device (e.g., the electronic device 100 of FIG. 2) may include determining, based at least partially on additional information on a plurality of applications, which are installed in the electronic device, at least one category to which each of the plurality of applications belongs, determining, based at least partially on relevant information on icons of applications belonging to each category, an image corresponding to the category, and displaying, on a screen of the display, a folder for each category, which contains the icons of the applications belonging to the same category of the at least one category, for each category based on the determined image.

The relevant information on the icons may include, for example, at least one of a color of an icon of the application, a pattern of the icon of the application, or a shape of the icon of the application.

The determining of the image may include determining the image, based at least partially on relevant information of an icon of on an application, which is the most recently used, an application, which has the highest use frequency, of applications belonging to the category, or all applications.

The additional information may include, for example, at least one of a name of the application, a package name of the application, a name of the manufacturer of the application, a tag associated with the application, a genre associated with the application, or a category associated with the application.

The displaying of the folder may include inserting an icon of a first application, which belongs to a plurality of categories, of the plurality of applications into folders for the plurality of categories.

The method for constructing the folder may further include merging, to one category, categories, which correspond to a category name having the same meaning or a similar meaning, of the at least one category.

The additional information on the plurality of applications may further include the use time of the plurality applications, and the determining of the category may include determining applications, which have not been used for a specified period or more, of the plurality of applications, as belonging to a first category, based at least on the information on the use time of the applications, and the displaying of the folder may include displaying, on the screen, a first folder, which contains icons of the applications which have not been used for the specified period or more, for the first category.

The additional information on the plurality of applications may further include information on a place in which the plurality of applications are used, and the determining of the category may include determining applications, which are used for at least the specified number of times in a specified place of the plurality of applications, as belonging to a specified place category, based at least on information on the place in which the plurality of applications are used, and the displaying of the folder may include displaying, on the screen, a folder, which contains an icon of applications belonging to the specified place category, for the specified place category.

The method for constructing the folder may further include, when a search word for searching for an application is input, searching for an application corresponding to the search word, based at least on names of the plurality of applications, a category name of the at least one category, or additional information on the plurality of applications.

Figure 4:
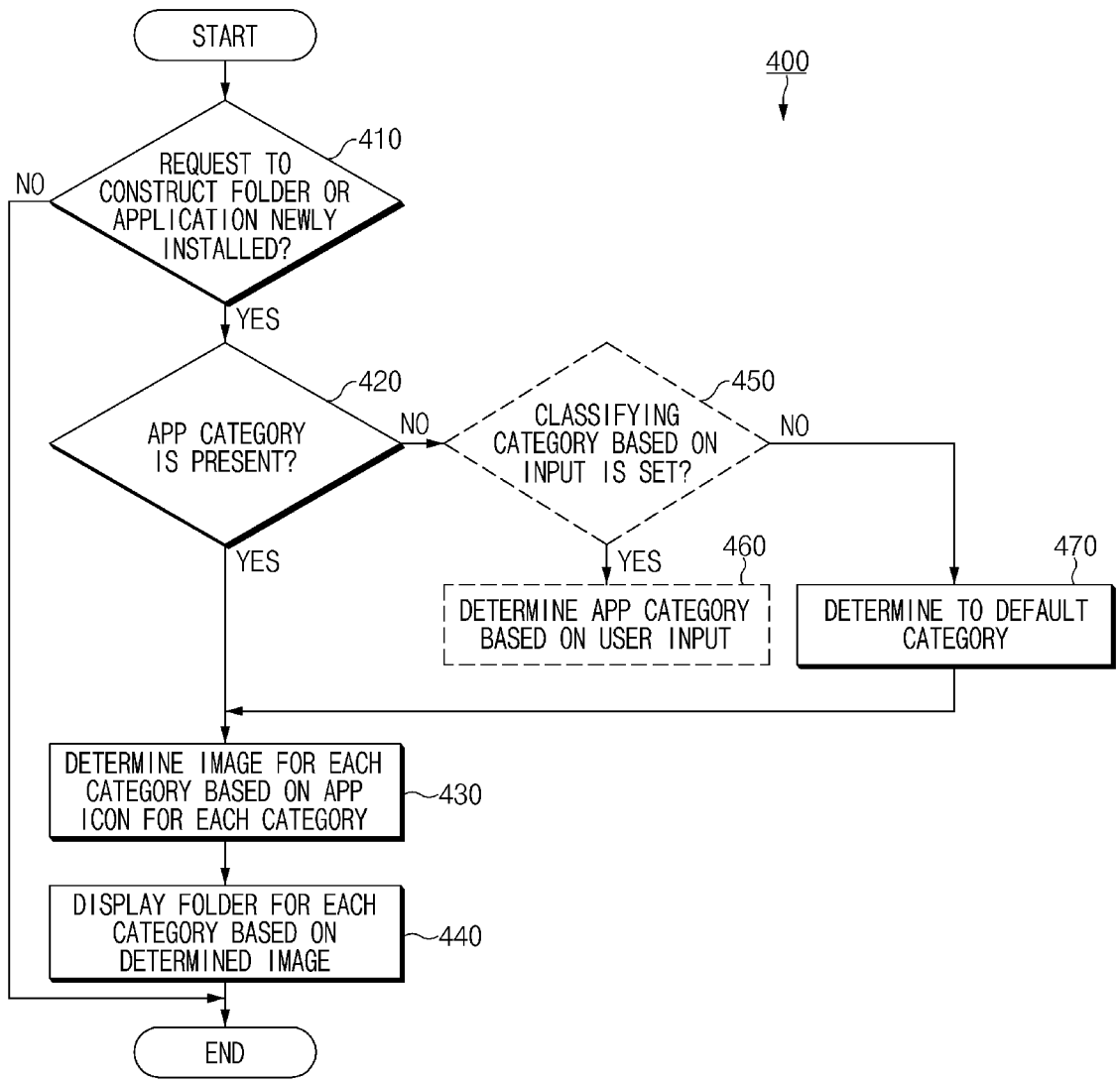
FIG. 4 illustrates a detailed flowchart of a method for constructing a folder by an electronic device, according to an embodiment.

FIG. 4 illustrates a detailed flowchart 400 of a method for constructing a folder by an electronic device, according to an embodiment.

Referring to FIG. 4, in operation 410, the electronic device 100 may determine whether a user requests to construct a folder or whether an application is newly installed.

In operation 420, the electronic device 100 may determine whether a category is present in association with applications installed in the electronic device 100, when it is determined, in operation 410, that the user requests to construct the folder or that the application is newly installed. The installed applications may include, for example, only applications, icons of which are displayed on the first screen of the display 130.

In operation 430, when it is determined that the category is present in association with the applications in operation 420, the electronic device 100 may determine an image for each category, based on relevant information on an icon of an application belonging to the category. When an image for each category, which is previously determined, is present, and when an application belonging to the category is not changed in operation 430, operation 430 may be omitted. The relevant information on the icons may include, for example, at least one of a color of an icon of the application, a pattern of the icon of the application, or a shape of the icon of the application. For example, the processor 150 may identify relevant information on an icon of an application belonging to each category and may determine an image for the category, based on the relevant information on the icon.

In operation 430, the electronic device 100 may display, on the first screen of the display 130, a folder, which contains the icon of the application belonging to the category, for the category based on the determined image for the category.

When it is determined that the category is absent in association with the installed applications in operation 420, the electronic device 100 may determine whether a function of classifying a category based on an input is set in operation 450. For example, the electronic device 100 may perform operation 450, when at least one application, a category of which is not determined (or classified), is present among the installed applications.

The electronic device 100 may determine a category with respect to an application having no category which is determined based on a user input in operation 460, when it is determined that the function of classifying the category based on the input is set in operation 450. For example, the electronic device 100 may display the list of applications, categories of which are not determined. The electronic device 100 may determine a category with respect to an application having no determined category, based on a user input for the displayed list of the application. According to an embodiment, operation 450 and operation 460 may be omitted.

When the electronic device 100 determines that the function of classifying the category based on the input is not set in operation 450, the electronic device 100 may determine a category for the application having no determined category to a default category in operation 470.

Figure 5:
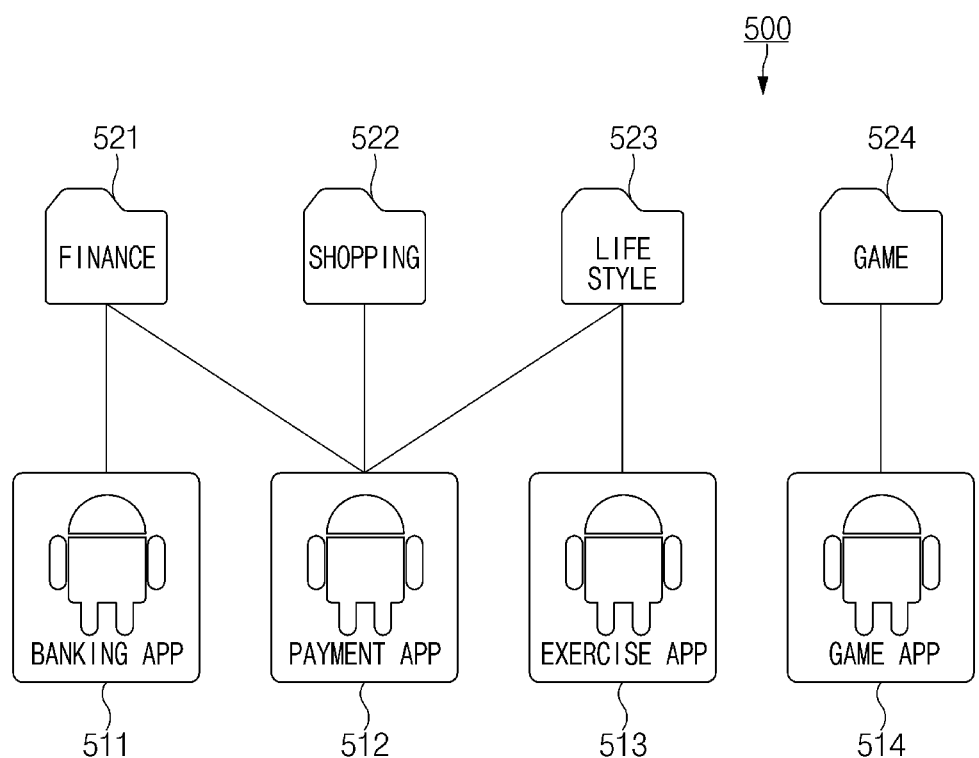
FIG. 5 illustrates the relationship between categories and applications, according to an embodiment.

FIG. 5 illustrates a relationship 500 between categories and applications, according to an embodiment.

Referring to FIG. 5, the electronic device 100 may determine at least one category, to which each application belongs, based on additional information of the application. For example, the electronic device 100 may determine a banking application 511 as belonging to a category 521 of "finance", an exercise application 513 as belonging to a category 523 of "lifestyle", and a game application 514 as belonging to a category 524 of "game". For another example, the electronic device 100 may determine a payment application 512 as belonging to the category 521 of "finance", a category 522 of "shopping", and the category 523 of "lifestyle".

According to the above-described embodiment, the electronic device 100 may construct folders of a plurality of categories such that each of the folders contains an icon of one application belonging to the plurality of categories.

Figure 6:
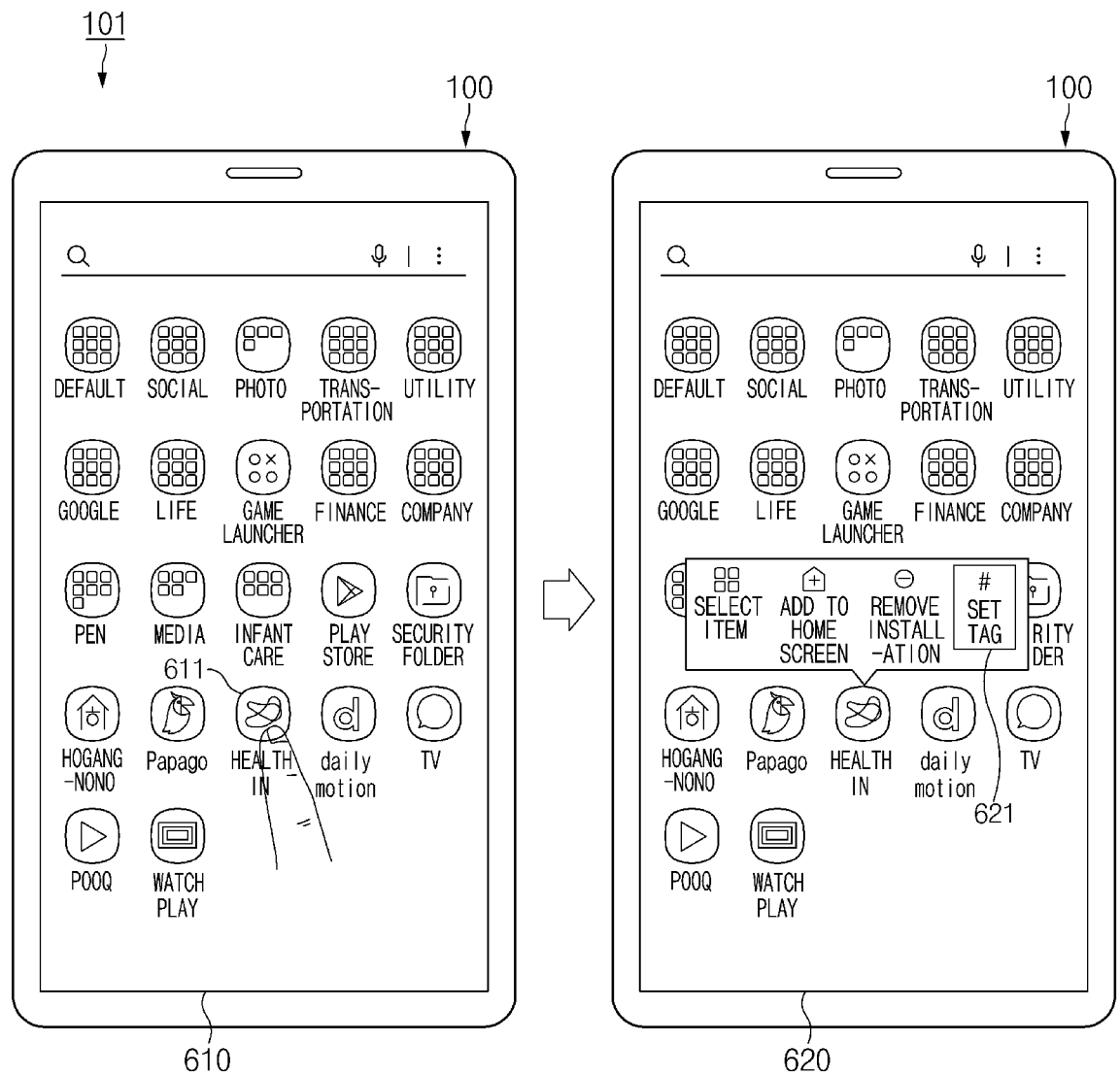
FIG. 6 illustrates a UI screen to explain a tag associated with an application of an electronic device, according to an embodiment.

FIG. 6 illustrates a UI screen 600 to explain a tag associated with an application of an electronic device, according to an embodiment.

Referring to FIG. 6, on a screen 610, an electronic device (e.g., the electronic device 100 of FIG. 1) may identify that an icon 611 of an application is selected through a long press input. When it is identified that the icon 611 of the application is selected through the long press input, the electronic device 100 may display, on a screen 620, a tag setting menu 621 for setting a tag associated with the application corresponding to the icon 611 of the selected application.

Thereafter, when the tag associated with the application is set based on the tag setting menu 621, the electronic device 100 stores, in a memory (e.g., the memory 140 of FIG. 2), the set tag associated with the application as additional information of the application. The tag associated with the application may be used to determine a category to which the application belongs.

Figure 7:
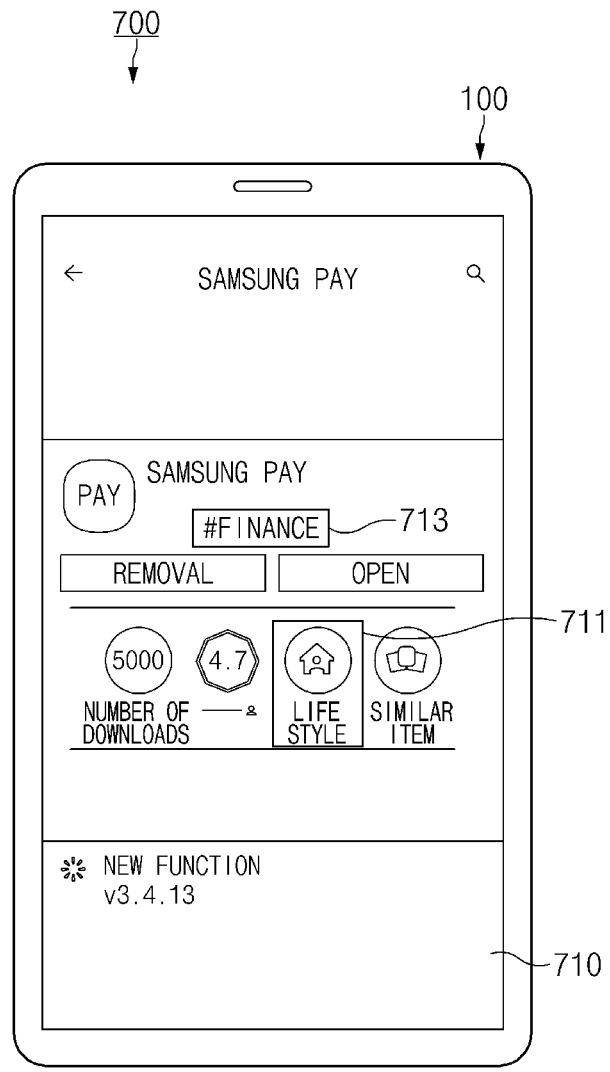
FIG. 7 illustrates a UI screen to explain a tag and a category associated with an application of an electronic device, according to an embodiment.

FIG. 7 illustrates a UI screen 700 to explain a tag and a category associated with an application of an electronic device, according to an embodiment.

Referring to FIG. 7, an electronic device (e.g., the electronic device 100 of FIG. 1) may display a screen 710 when an application of "Samsung Pay" is selected in, for example, an app download site. The screen 710 may include, for example, a category name 711 to which the application of "Samsung Pay" belongs and tag information 713 associated with the application of "Samsung Pay". When a function of downloading the application of "Samsung Pay" is selected, the electronic device 100 may receive the category name 711 and the tag information 713 associated with the application of "Samsung Pay" from the app download site (or an external server to provide the app download site). The electronic device 100 may store, in the memory (e.g., the memory 140 of FIG. 2), the category name 711 and the tag information 713, which are received, as the additional information of the application of "Samsung Pay". Alternatively, when the app download site does not provide the category name 711 and the tag information 713 associated with the application of "Samsung Pay", the electronic device 100 may detect the category name 711 and the tag information 713 associated with the application of "Samsung Pay" from the app download site, and may store, in the memory, the detected category name 711 and the detected tag information 713 associated with the application of "Samsung Pay" as an additional information of the application of "Samsung Pay".

Figure 8:
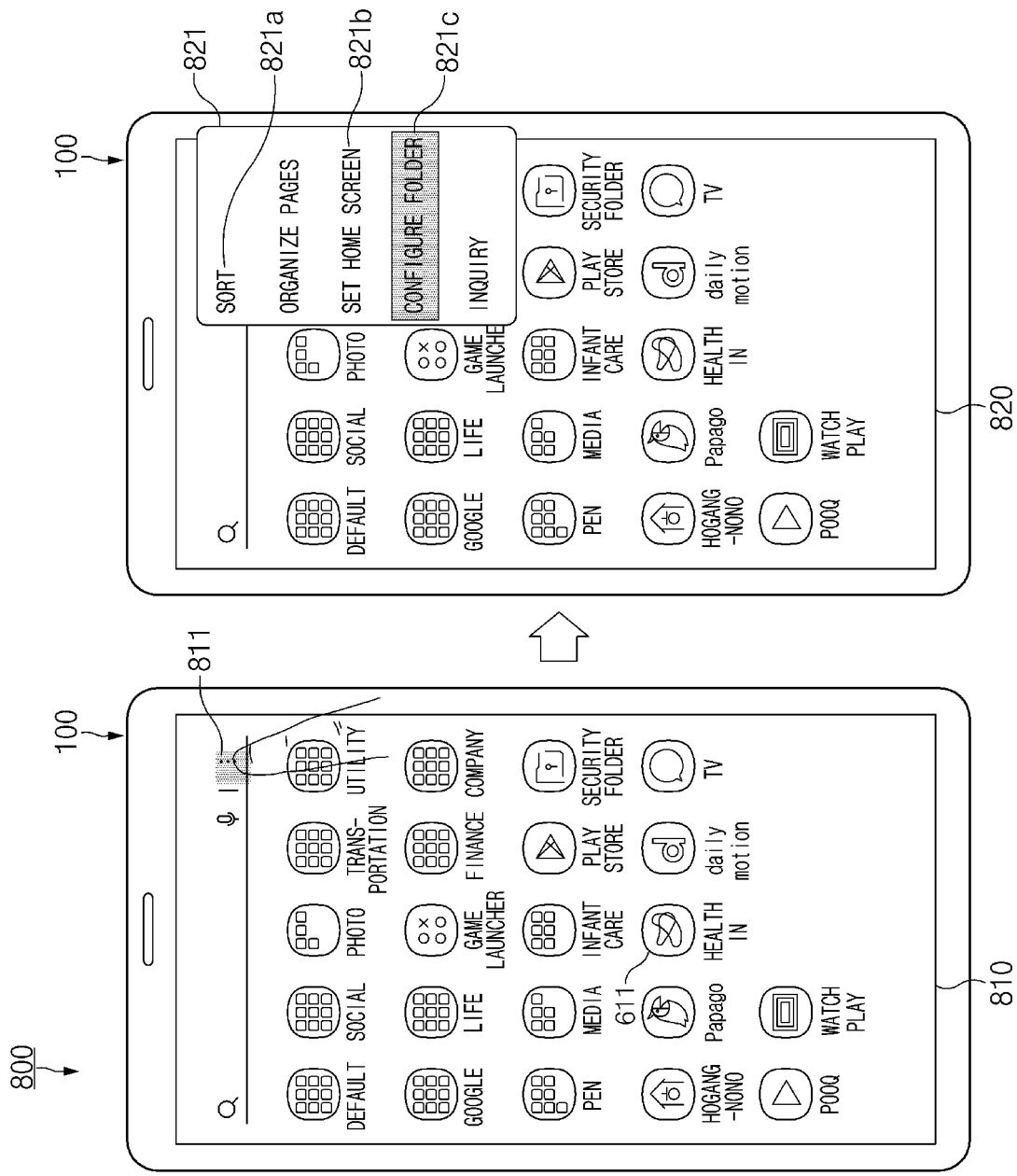
FIG. 8 illustrates a UI screen to request for an electronic device to construct a folder, according to an embodiment.

FIG. 8 illustrates a UI screen 800 to request for an electronic device to construct a folder, according to an embodiment.

Referring to FIG. 8, on a screen 810, when an input (e.g., a touch on an icon 811) for setting a first screen occurs, the electronic device 100 may provide a first screen setting window 821 on a screen 820. The first screen setting window 821 may include, for example, constructing a folder for icons of an application (821c).

Thereafter, when the constructing of the folder for the icons of the application (821c) is selected, the electronic device 100 may identify a category to which applications installed in the electronic device 100 belong, may display, on a first screen of a display (e.g., the display 130 of FIG. 2), a folder containing an icon of an application for each category, based on the category.

In addition, the first screen setting window 821 may further include sorting icons of application (821a) and setting of a home screen (a first screen) (821b). When the sorting of icons of applications (821a) is selected, the electronic device 100 may display the icons and a folder of an application displayed on the screen 820 in specified order (e.g., the order of "A", "B", and "C", and the latest order). When the setting of the home screen (821b) is selected, the electronic device 100 may provide menus, such as first screen arrangement and first screen configuration, for setting the first screen.

Figure 9:
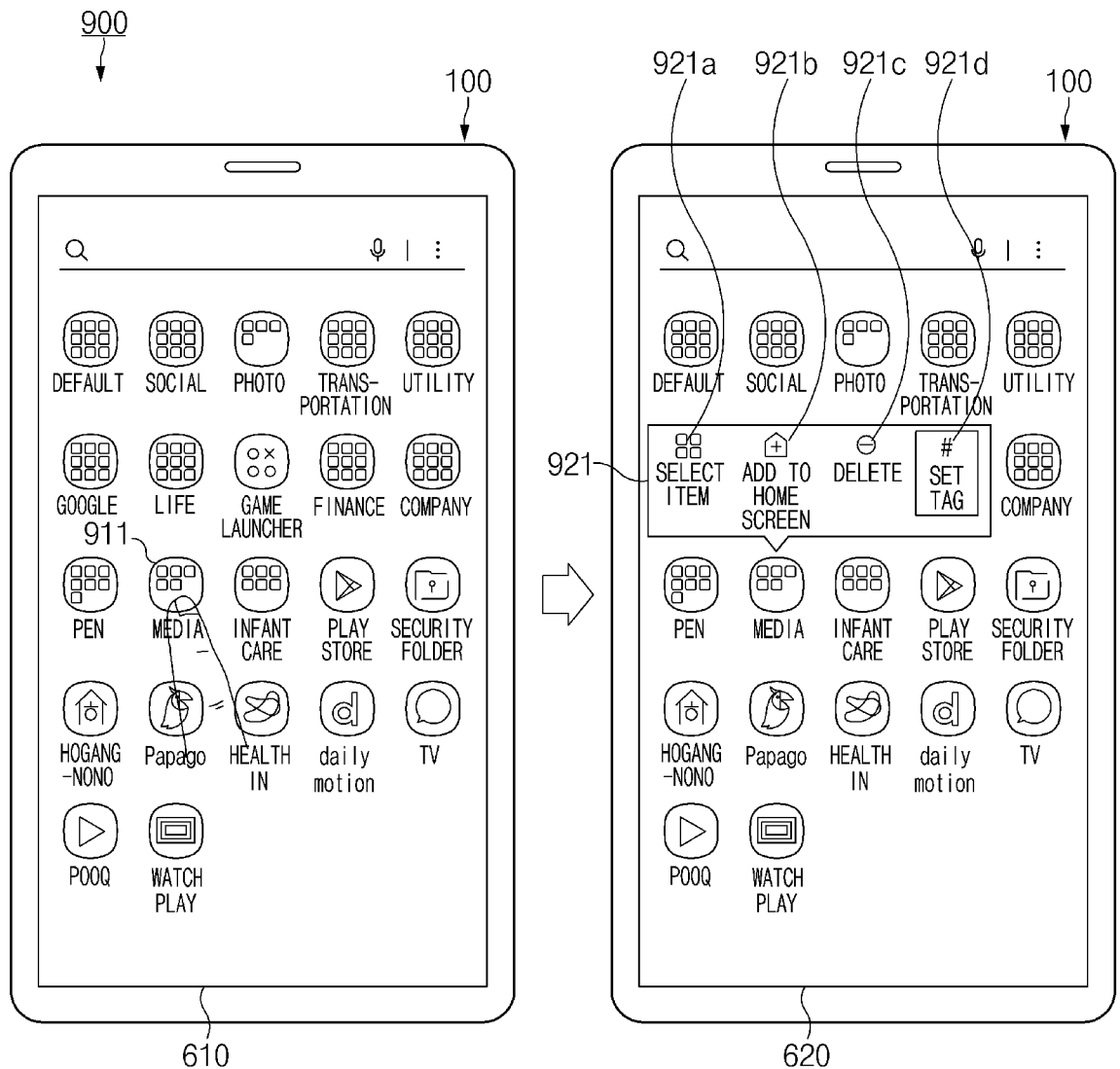
FIG. 9 is an example of a UI screen to edit a folder of an electronic device, according to an embodiment.

FIG. 9 is an example 900 of a UI screen to edit a folder of an electronic device, according to an embodiment.

Referring to FIG. 9, when a folder 911 is selected through a long press input on a screen 910, the electronic device 100 may display a folder setting window 921 for the selected folder 911 on a screen 920. The folder setting window 921 may include an icon adding menu 921a for the folder 911, a home screen adding menu 921b for the folder 911, a menu 921c of requesting to delete the folder 911, and a menu 921d of setting a tag associated with the folder 911. The electronic device 100 may provide a function of adding an icon of an application to the folder 911, when the icon adding menu 921a is selected. The electronic device 100 may add the selected folder 911 to the home screen, when the home screen adding menu 921b is selected. The electronic device 100 may delete the selected folder 911, when the menu 921c of requesting to delete the folder 911 is selected. The electronic device 100 may provide a window for setting a tag, and may store the tag set through the provided window, in a memory (e.g., the memory 140 of FIG. 1) as tag information associated with the folder 911, when the menu 921d of setting the tag is selected. Thereafter, the tag information associated with the folder 911 may be used when searching for an application or a folder.

Figure 10:
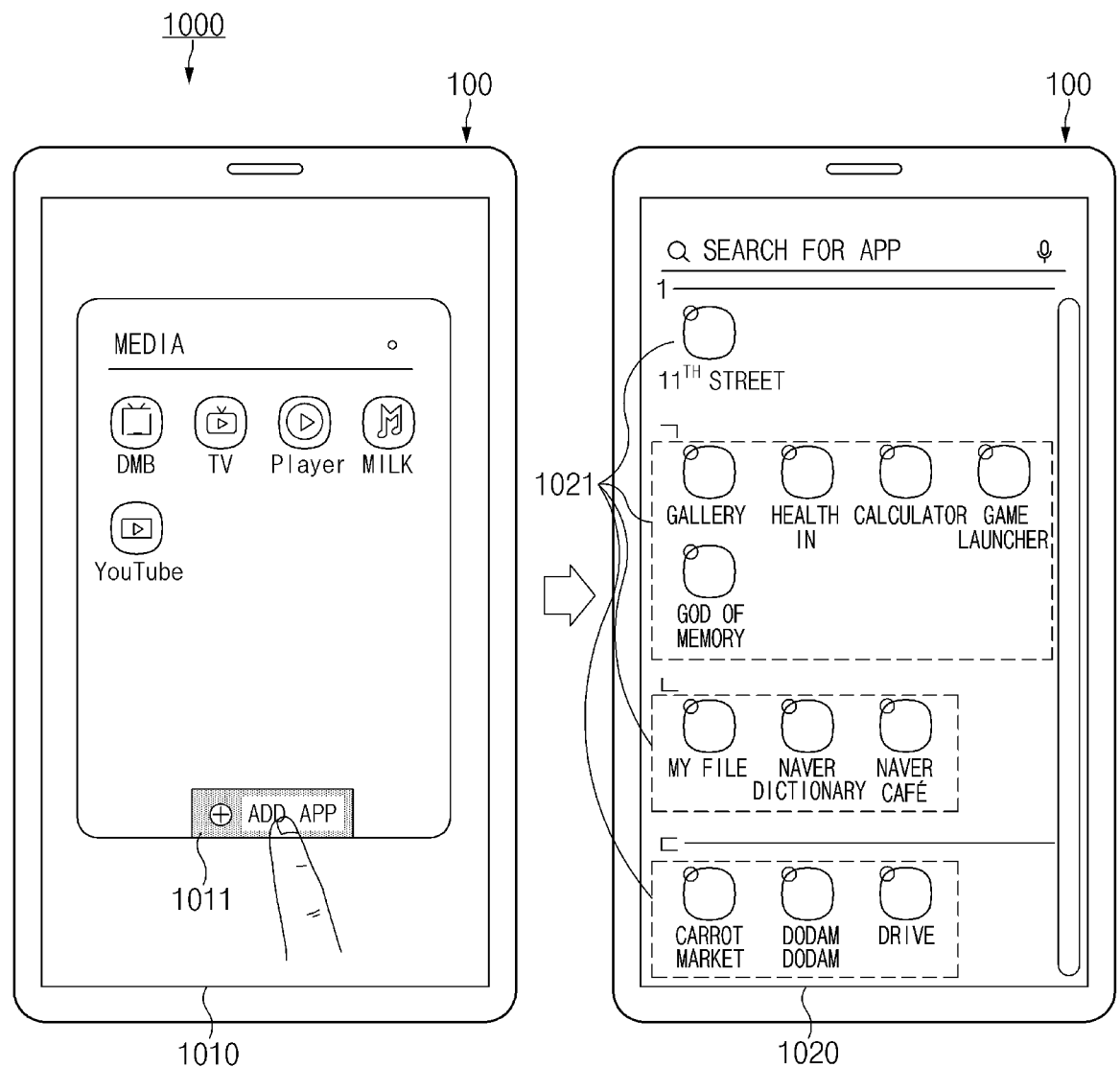
FIG. 10 is another example of a UI screen to edit a folder of an electronic device, according to an embodiment.

FIG. 10 is another example 1000 of a UI screen to edit a folder of an electronic device, according to an embodiment.

Referring to FIGS. 9 and 10, when the icon adding menu 921a for the folder 911 is selected through the screen 910, the electronic device 100 may display icons of applications contained in the folder 911 on a screen 1010. The electronic device 100 may display icon lists 1021 of the application on a screen 1020, when a virtual button 1011 for adding an application is selected on the screen 1010. Thereafter, the electronic device 100 may add, to the folder 911, an icon selected from the displayed icon lists 1021.

Figure 11:
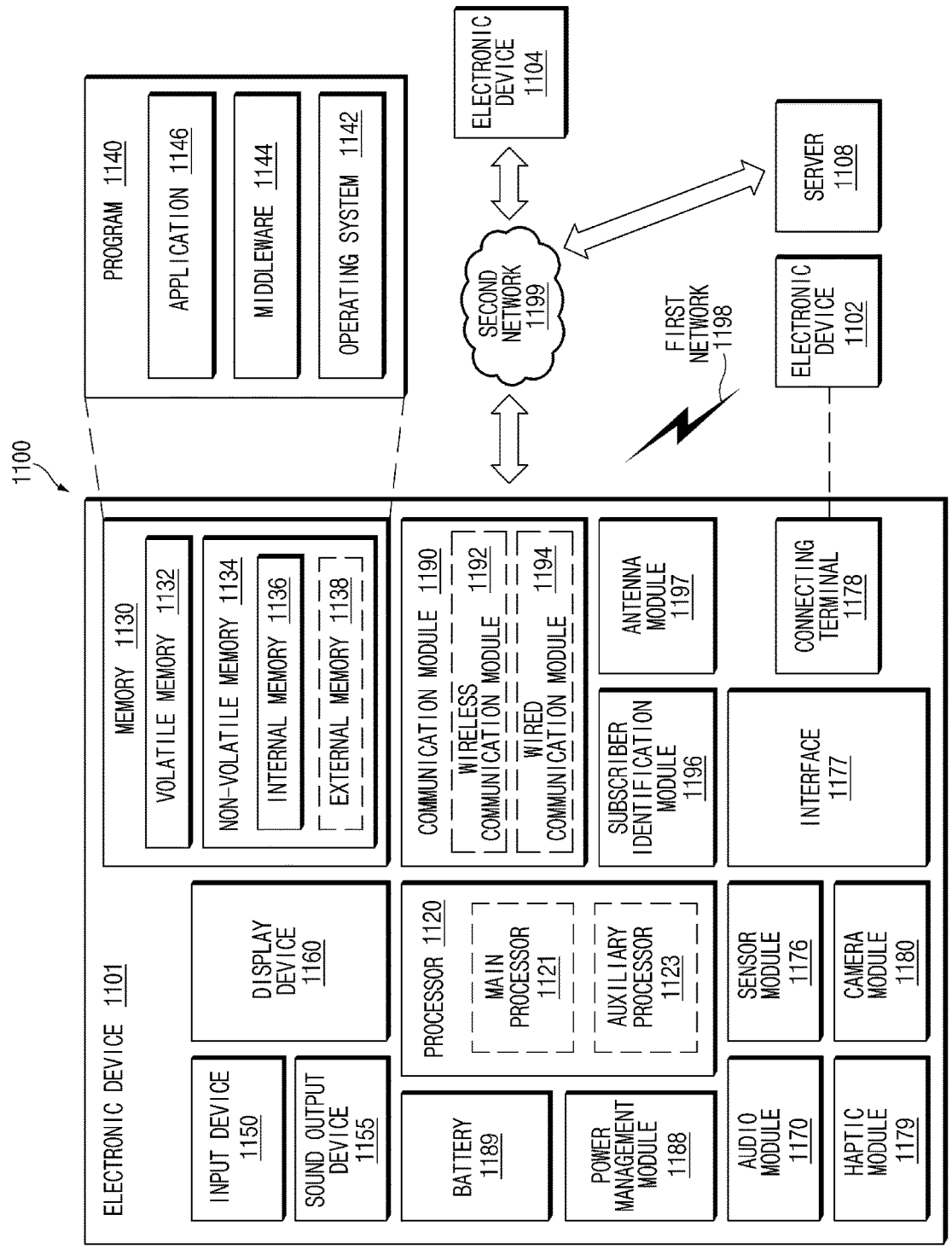
FIG. 11 illustrates a block diagram of an electronic device in a network environment of providing a function of constructing a folder, according to various embodiments.

FIG. 11 is a block diagram illustrating an electronic device 1101 in a network environment 1100 according to various embodiments. Referring to FIG. 11, the electronic device 1101 in the network environment 1100 may communicate with an electronic device 1102 via a first network 1198 (e.g., a short-range wireless communication network), or an electronic device 1104 or a server 1108 via a second network 1199 (e.g., a long-range wireless communication network). According to an embodiment, the electronic device 1101 may communicate with the electronic device 1104 via the server 1108. According to an embodiment, the electronic device 1101 may include a processor 1120, memory 1130, an input device 1150, a sound output device 1155, a display device 1160, an audio module 1170, a sensor module 1176, an interface 1177, a haptic module 1179, a camera module 1180, a power management module 1188, a battery 1189, a communication module 1190, a subscriber identification module (SIM) 1196, or an antenna module 1197. In some embodiments, at least one (e.g., the display device 1160 or the camera module 1180) of the components may be omitted from the electronic device 1101, or one or more other components may be added in the electronic device 1101. In some embodiments, some of the components may be implemented as single integrated circuitry. For example, the sensor module 1176 (e.g., a fingerprint sensor, an iris sensor, or an illuminance sensor) may be implemented as embedded in the display device 1160 (e.g., a display).

The processor 1120 may execute, for example, software (e.g., a program 1140) to control at least one other component (e.g., a hardware or software component) of the electronic device 1101 coupled with the processor 1120, and may perform various data processing or computation. According to one embodiment, as at least part of the data processing or computation, the processor 1120 may load a command or data received from another component (e.g., the sensor module 1176 or the communication module 1190) in volatile memory 1132, process the command or the data stored in the volatile memory 1132, and store resulting data in non-volatile memory 1134. According to an embodiment, the processor 1120 may include a main processor 1121 (e.g., a central processing unit (CPU) or an application processor (AP)), and an auxiliary processor 1123 (e.g., a graphics processing unit (GPU), an image signal processor (ISP), a sensor hub processor, or a communication processor (CP)) that is operable independently from, or in conjunction with, the main processor 1121. Additionally or alternatively, the auxiliary processor 1123 may be adapted to consume less power than the main processor 1121, or to be specific to a specified function. The auxiliary processor 1123 may be implemented as separate from, or as part of the main processor 1121.

The auxiliary processor 1123 may control at least some of functions or states related to at least one component (e.g., the display device 1160, the sensor module 1176, or the communication module 1190) among the components of the electronic device 1101, instead of the main processor 1121 while the main processor 1121 is in an inactive (e.g., sleep) state, or together with the main processor 1121 while the main processor 1121 is in an active state (e.g., executing an application). According to an embodiment, the auxiliary processor 1123 (e.g., an image signal processor or a communication processor) may be implemented as part of another component (e.g., the camera module 1180 or the communication module 1190) functionally related to the auxiliary processor 1123.

The memory 1130 may store various data used by at least one component (e.g., the processor 1120 or the sensor module 1176) of the electronic device 1101. The various data may include, for example, software (e.g., the program 1140) and input data or output data for a command related thereto. The memory 1130 may include the volatile memory 1132 or the non-volatile memory 1134.

The program 1140 may be stored in the memory 1130 as software, and may include, for example, an operating system (OS) 1142, middleware 1144, or an application 1146.

The input device 1150 may receive a command or data to be used by other component (e.g., the processor 1120) of the electronic device 1101, from the outside (e.g., a user) of the electronic device 1101. The input device 1150 may include, for example, a microphone, a mouse, a keyboard, or a digital pen (e.g., a stylus pen).

The sound output device 1155 may output sound signals to the outside of the electronic device 1101. The sound output device 1155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1160 may visually provide information to the outside (e.g., a user) of the electronic device 1101. The display device 1160 may include, for example, a display, a hologram device, or a projector and control circuitry to control a corresponding one of the display, hologram device, and projector. According to an embodiment, the display device 1160 may include touch circuitry adapted to detect a touch, or sensor circuitry (e.g., a pressure sensor) adapted to measure the intensity of force incurred by the touch.

The audio module 1170 may convert a sound into an electrical signal and vice versa. According to an embodiment, the audio module 1170 may obtain the sound via the input device 1150, or output the sound via the sound output device 1155 or a headphone of an external electronic device (e.g., an electronic device 1102) directly (e.g., wiredly) or wirelessly coupled with the electronic device 1101.

The sensor module 1176 may detect an operational state (e.g., power or temperature) of the electronic device 1101 or an environmental state (e.g., a state of a user) external to the electronic device 1101, and then generate an electrical signal or data value corresponding to the detected state. According to an embodiment, the sensor module 1176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1177 may support one or more specified protocols to be used for the electronic device 1101 to be coupled with the external electronic device (e.g., the electronic device 1102) directly (e.g., wiredly) or wirelessly. According to an embodiment, the interface 1177 may include, for example, a high definition multimedia interface (HDMI), a universal serial bus (USB) interface, a secure digital (SD) card interface, or an audio interface.

A connecting terminal 1178 may include a connector via which the electronic device 1101 may be physically connected with the external electronic device (e.g., the electronic device 1102). According to an embodiment, the connecting terminal 1178 may include, for example, a HDMI connector, a USB connector, a SD card connector, or an audio connector (e.g., a headphone connector).

The haptic module 1179 may convert an electrical signal into a mechanical stimulus (e.g., a vibration or a movement) or electrical stimulus which may be recognized by a user via his tactile sensation or kinesthetic sensation. According to an embodiment, the haptic module 1179 may include, for example, a motor, a piezoelectric element, or an electric stimulator.

The camera module 1180 may capture a still image or moving images. According to an embodiment, the camera module 1180 may include one or more lenses, image sensors, image signal processors, or flashes.

The power management module 1188 may manage power supplied to the electronic device 1101. According to one embodiment, the power management module 1188 may be implemented as at least part of, for example, a power management integrated circuit (PMIC).

The battery 1189 may supply power to at least one component of the electronic device 1101. According to an embodiment, the battery 1189 may include, for example, a primary cell which is not rechargeable, a secondary cell which is rechargeable, or a fuel cell.

The communication module 1190 may support establishing a direct (e.g., wired) communication channel or a wireless communication channel between the electronic device 1101 and the external electronic device (e.g., the electronic device 1102, the electronic device 1104, or the server 1108) and performing communication via the established communication channel. The communication module 1190 may include one or more communication processors that are operable independently from the processor 1120 (e.g., the application processor (AP)) and supports a direct (e.g., wired) communication or a wireless communication. According to an embodiment, the communication module 1190 may include a wireless communication module 1192 (e.g., a cellular communication module, a short-range wireless communication module, or a global navigation satellite system (GNSS) communication module) or a wired communication module 1194 (e.g., a local area network (LAN) communication module or a power line communication (PLC) module). A corresponding one of these communication modules may communicate with the external electronic device via the first network 1198 (e.g., a short-range communication network, such as Bluetooth™ wireless-fidelity (Wi-Fi) direct, or infrared data association (IrDA)) or the second network 1199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1192 may identify and authenticate the electronic device 1101 in a communication network, such as the first network 1198 or the second network 1199, using subscriber information (e.g., international mobile subscriber identity (IMSI)) stored in the subscriber identification module 1196.

The antenna module 1197 may transmit or receive a signal or power to or from the outside (e.g., the external electronic device) of the electronic device 1101. According to an embodiment, the antenna module 1197 may include an antenna including a radiating element composed of a conductive material or a conductive pattern formed in or on a substrate (e.g., PCB). According to an embodiment, the antenna module 1197 may include a plurality of antennas. In such a case, at least one antenna appropriate for a communication scheme used in the communication network, such as the first network 1198 or the second network 1199, may be selected, for example, by the communication module 1190 (e.g., the wireless communication module 1192) from the plurality of antennas. The signal or the power may then be transmitted or received between the communication module 1190 and the external electronic device via the selected at least one antenna. According to an embodiment, another component (e.g., a radio frequency integrated circuit (RFIC)) other than the radiating element may be additionally formed as part of the antenna module 1197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1101 and the external electronic device 1104 via the server 1108 coupled with the second network 1199. Each of the electronic devices 1102 and 1104 may be a device of a same type as, or a different type, from the electronic device 1101. According to an embodiment, all or some of operations to be executed at the electronic device 1101 may be executed at one or more of the external electronic devices 1102, 1104, or 1108. For example, if the electronic device 1101 should perform a function or a service automatically, or in response to a request from a user or another device, the electronic device 1101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1101. The electronic device 1101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1140) including one or more instructions that are stored in a storage medium (e.g., internal memory 1136 or external memory 1138) that is readable by a machine (e.g., the electronic device 1101). For example, a processor (e.g., the processor 1120) of the machine (e.g., the electronic device 1101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a display;
a processor operatively connected with the display; and
a memory operatively connected with the processor,
wherein the memory is configured to:
store at least one application and additional information associated with the at least one application, and
wherein the memory stores instructions that, when executed, cause the processor to:
determine, based at least partially on additional information on a plurality of applications installed in the electronic device, at least one category to which the plurality of applications belong;
display, on a screen of the display, a folder, which contains icons of the applications belonging to a same category, for each determine category; and
when a plurality of categories having different category names with a same meaning or a similar meaning are identified based the at least partially on the additional information:
merge, into a single category, the plurality of categories having different category names with the same meaning or the similar meaning, and
display a single folder which contains the icons of the applications belonging to the merged category.

2. The electronic device of claim 1,
wherein the instructions further cause the processor:
determine, based at least partially on relevant information on icons of applications belonging to the same category of the at least one category, an image corresponding to the at least one category, and
display, on the screen of the display, the folder, which contains the icons of the applications belonging to the same category and corresponds to the determined image, for each determined category, and
wherein the relevant information on the icons of the applications comprises:
at least one of a color of the icons of the applications, a pattern of the icons of the applications, or a shape of the icons of the applications.

3. The electronic device of claim 1, wherein the instructions further cause the processor to:
determine an image, based at least partially on relevant information of an icon of an application, which is the most recently used, an application, which has the highest use frequency, or all applications of applications belonging to the category.

4. The electronic device of claim 1, wherein the additional information comprises:
at least one of a name of the application, a package name of the application, a name of a manufacturer of the application, a tag associated with the application, a genre associated with the application, or a category associated with the application.

5. The electronic device of claim 1, wherein the instructions further cause the processor to:
insert an icon of a first application, which belongs to the plurality of categories, of the plurality of applications into folders for the plurality of categories.

6. The electronic device of claim 1,
wherein the instructions further cause the processor to:
determine, based at least partially on relevant information on icons of applications belonging to the merged category, an image corresponding to the merged category, and
display the single folder corresponds to the determined image, and wherein the relevant information on the icons of the applications includes:
at least one of a color of the icons of the applications, a pattern of the icons of the applications, or a shape of the icons of the applications.

7. The electronic device of claim 1, wherein the instructions further cause the processor to:
display, on the screen, a category list corresponding to the category name having the same meaning or the similar meaning, and
merge, into one category, at least some categories in the category list, based at least partially on a user input for the category list.

8. The electronic device of claim 1, wherein the instructions further cause the processor to:
provide a user interface to specify the category name for categories having the same meaning or the similar meaning.

9. The electronic device of claim 1,
wherein the additional information on the plurality of applications further comprises:
information on use time of the plurality applications, and wherein the instructions cause the processor to:
determine applications, which have not been used for a specified period or more, of the plurality of applications, as belonging to a first category, based at least on the information on the use time of the plurality of applications, and
display, on the screen, a first folder, which contains icons of the applications which have not been used for the specified period or more, for the first category.

10. The electronic device of claim 1,
wherein the additional information on the plurality of applications further comprises:
information on a place in which the plurality of applications are used, and wherein the instructions further cause the processor to:

determine applications, which are used by at least a specified number of times in a specified place, of the plurality of applications, as belonging to a specified place category, based at least on the information on the place in which the plurality of applications are used, and display, on the screen, a folder, which contains an icon of the applications belonging to the specified place category, for the specified place category.

11. The electronic device of claim 1, wherein the instructions further cause the processor to:

when a search word for searching for an application is input, search for an application corresponding to the search word, based at least on the additional information on the plurality of applications.

12. A method for constructing a folder by an electronic device, the method comprises:

determining, based at least partially on additional information on a plurality of applications installed in the electronic device, at least one category to which the plurality of applications belong; and displaying, on a screen of a display, a folder, which contains icons of applications belonging to the same category of the at least one category, for each determine category, wherein the method further comprises:

when a plurality of categories having different category names with a same meaning or a similar meaning are determined based the at least partially on the additional information:

merging, into a single category, the plurality of categories having different category names with the same meaning or the similar meaning, and displaying a single folder which contains the icons of the applications belonging to the merged category.

13. The method of claim 12, further comprising:

determining, based at least partially on relevant information on icons of applications belonging to the same category of the at least one category, an image corresponding to the at least one category, and displaying, on the screen of the display, the folder, which contains the icons of the applications belonging to the same category and corresponds to the determined image, for each determined category, wherein the relevant information on the icons of the applications comprises:

at least one of a color of the icons of the applications, a pattern of the icons of the applications, or a shape of the icons of the applications.

14. The method of claim 12, wherein the determining of an image comprises:

determining the image, based at least partially on relevant information of an icon of an application, which is the most recently used, an application, which has the highest use frequency, or all applications of applications belonging to the category.

15. The method of claim 12, wherein the additional information comprises:

at least one of a name of the application, a package name of the application, a name of a manufacturer of the application, a tag associated with the application, a genre associated with the application, or a category associated with the application.

* * * * *